June 16, 1936.  W. F. ALDER  2,043,983
APPARATUS FOR DETERMINING AMPLITUDE OF SOUND
Filed Oct. 22, 1931  3 Sheets-Sheet 1
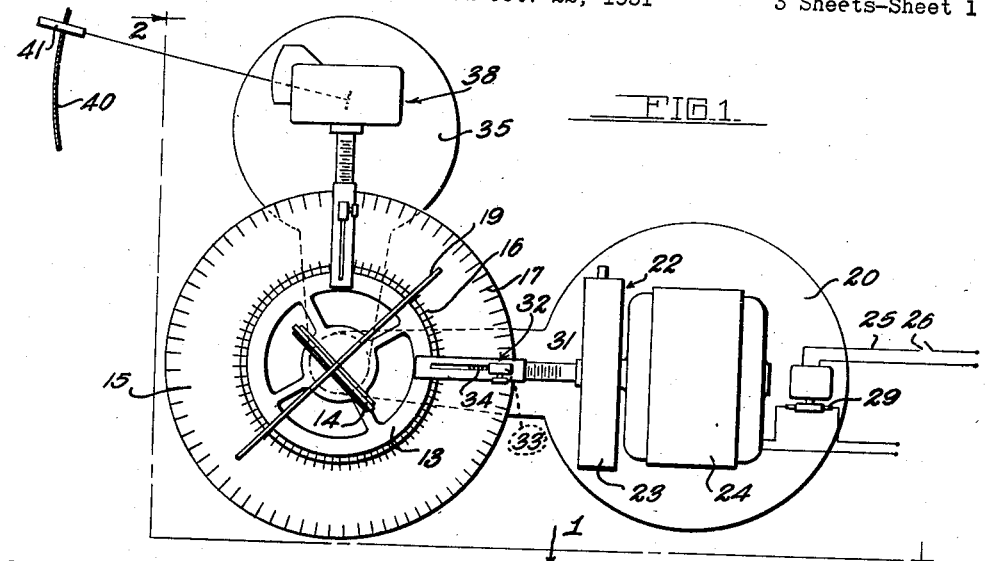
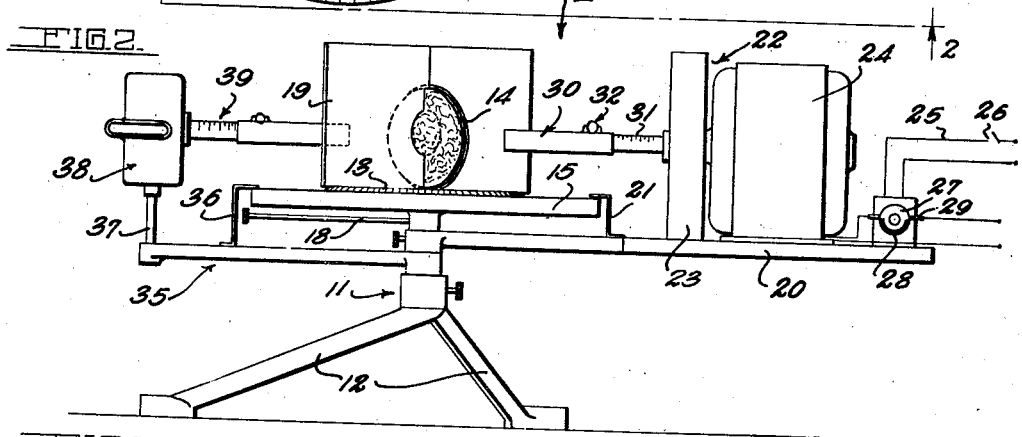
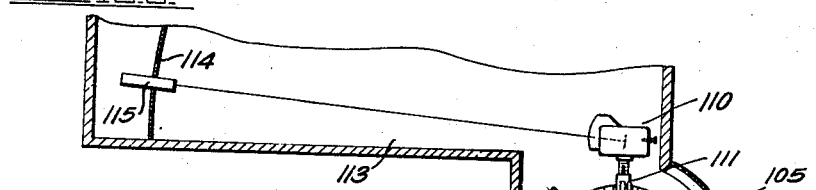
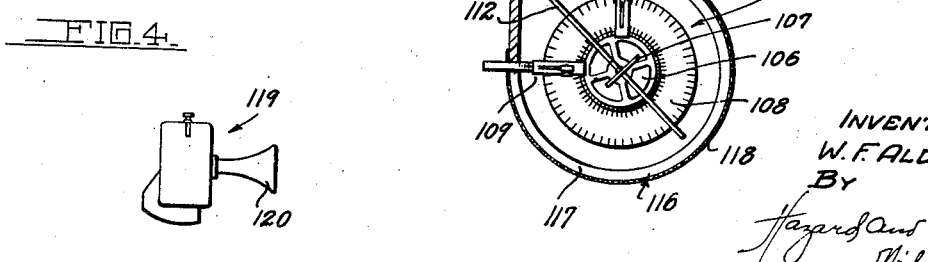
INVENTOR
W. F. ALDER
BY
Hazard and
Miller
ATTORNEYS.

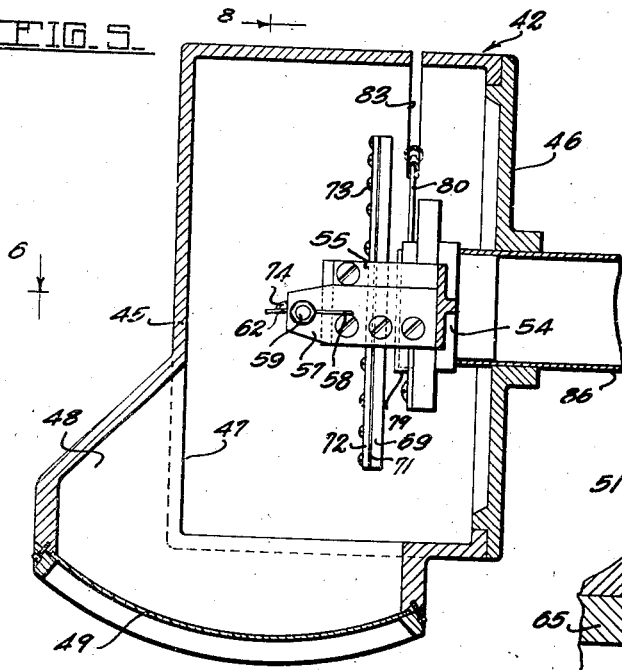

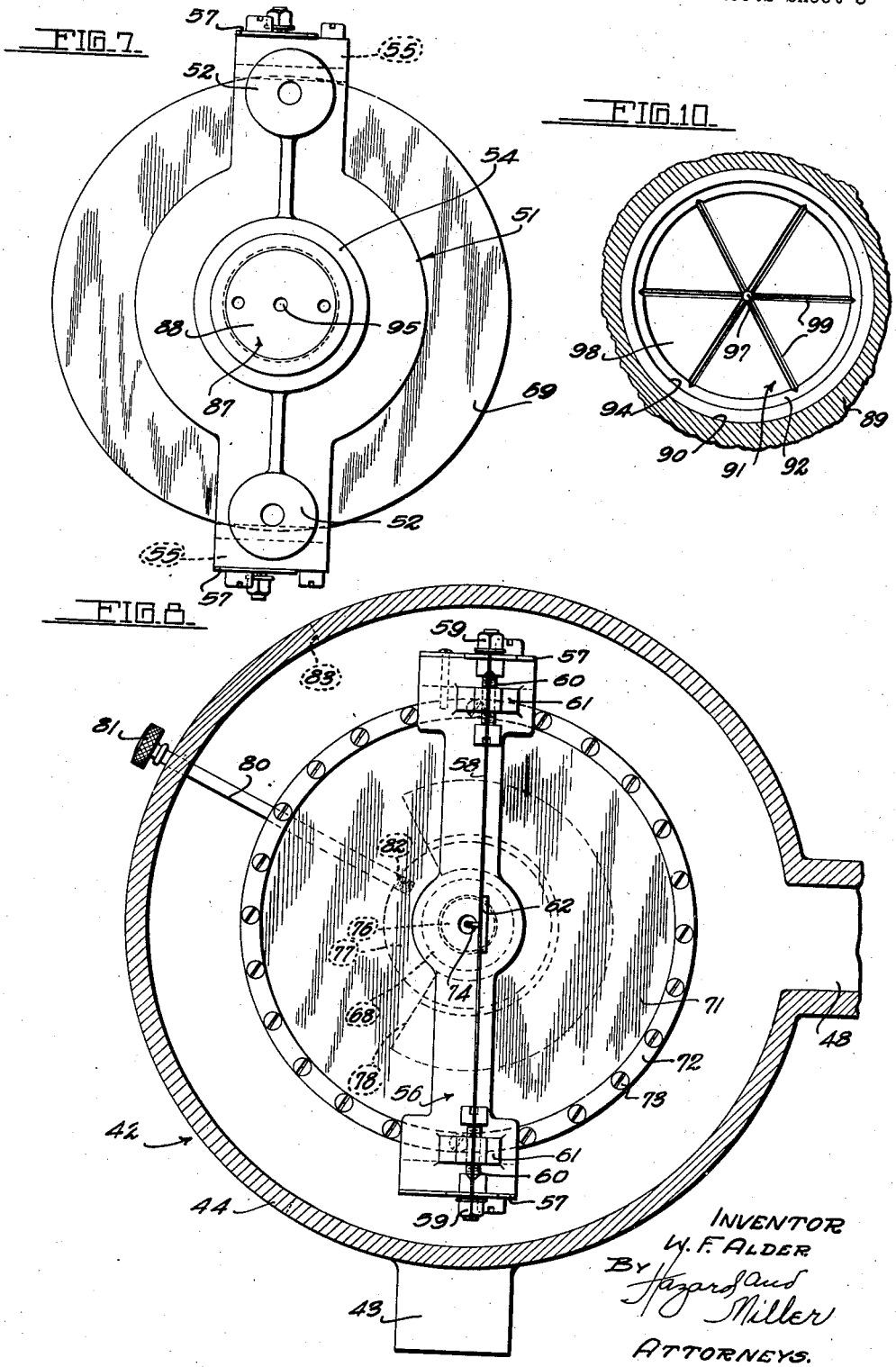

Patented June 16, 1936

2,043,983

UNITED STATES PATENT OFFICE 2,043,983

APPARATUS FOR DETERMINING AMPLITUDE OF SOUND

William F. Alder, Altadena, Calif., assignor, by mesne assignments, to Jenness A. Alder, Altadena, Calif.

Application October 22, 1931, Serial No. 570,486

8 Claims. (Cl. 73—51)

My invention relates to an apparatus by which the amplitude, that is, the intensity or loudness of sounds may be accurately determined and, in addition, that the sounds transmitted through a material or reflected from such material may be measured. An object, therefore, of my invention is the provision of a general apparatus in which there may be a source of sound and the material to be tested may be arranged either for the transmission or the reflection of sound, the transmission of the sound through the material giving an indication of the absorption of sound by such material, and the reflection of the sound giving a record of the intensity of sounds reflected from various angles from the material under test.

Another general object and feature of my invention is the provision of an instrument having a suitable mounting in which material to be tested may be placed and also with a sound producing device in which the sounds may be directed either through or at an angle to the material. With this I utilize what might be termed a sound amplitude meter, such being a device which gives an indication of the amplitude or loudness of the sound received by such instrument, such sound being either that transmitted through the material or reflected off the face of such material. In this instrument I provide a protractor with suitable adjustments and clamps so that the material may be placed at a suitable angle so that the source of sound may be arranged to project the sound at a desired angle incident to the material and the receiving sound amplitude meter. It may also be positioned to receive either the transmitted or reflected sound waves.

Another object and feature of my invention comprises an arrangement by using, preferably, a tunable resonator by which the source of sound may be accurately tuned to a certain pitch with or without its overtones and that the receiving meter instrument is also provided with a tuning resonator so that only the desired sounds are received by its resonator and used to give an indication in the amplitude determining instrument.

Another object and feature of my invention as relates to the specific instrument for determining the amplitude of sound comprises a construction in which the condensation or compression waves of sound are utilized to build up an internal air pressure, which air pressure actuates an indicating device such as a reflected beam of light or a pointer. For accurate work the reflected light appears to be more desirable. In this specific instrument I provide an expandible air chamber having, preferably, a flexible diaphragm on one side with a connection from such diaphragm to a tiltable mirror or to an oscillating arm. In order to admit the compression or condensation portions of the sound wave and to prevent the exhaustion of air by the rarefaction parts of the wave I provide a very delicate check valve as an inlet to the air chamber. By this means I provide a construction by which the compression or condensation parts of the waves may accumulatively build up an increased air pressure in the expansion chamber. This causes a deflection of the diaphragm and, hence, gives a swinging movement to the beam of light or moves a pointer arm, these latter devices being utilized to indicate on a scale the pressure developed and, hence, they give a reading of the amplitude, that is, the intensity or loudness of the sound by which a test is being made.

Another characteristc of my amplitude detecting instrument and its use is that the check valve, if not subjected to sound, will allow the slow release of the trapped air in the expansion chamber whereby the condition of the device may return to normal, and in making tests I preferably subject the instrument for a predetermined time to the sound waves and then have a predetermined period of rest, alternating these for a sufficient length of time to obtain an accurate average of the readings.

A further detailed feature of my invention utilized principally for absorption and reflection of sound is a sound source, usually a siren electrically driven, with a tunable resonator tube connected to the siren by which sounds of the desired pitch may be directed in the proper manner on or through the material under test, and in order to obtain the periods of sound and quiet for allowing the sound amplitude meter to return to zero I may make and break the electric current, a simple way being to use a synchronous motor geared to make and break a circuit at predetermined intervals. A comprehensive mounting for a testing instrument may comprise a stand in which, on the vertical axis of the stand, there is mounted an adjustable holder for the material to be tested. This holder is rotatable. A plurality of radial arms extend from the stand, one having a source of sound thereon, such as an electrically operated siren with or without the tunable resonating tube, and the other arm is provided with a sound amplitude meter, this preferably having a resonator tube. The axes of the resonators are preferably arranged on an axis with the vertical axis of the holder as a center and these swing on a horizontal plane. The two arms may then be positioned to cause the reflection of the sound from the material to be tested at any desired angle, and in such test it is preferable to use a baffle between the source of sound and the receiving instrument so that only the reflected sound waves act on the amplitude meter. The arms may be positioned directly opposite one another for making tests of the absorption of sound.

Another manner of operating my testing instrument is to place the meter with the material holder and a resonator, if desired, in a sound proof cabinet, the resonator extending outside of the cabinet to pick up and respond to sounds of the particular frequency desired. In this case it is usual to turn the holder to secure the desired angle of reflection.

My sound amplitude indicator may also be used to pick up the complete sound by discarding the resonator and using a bell or a funnel in which to collect all sounds and noises, in which case the instrument may then be utilized to determine the amplitude of various sounds, such as ordinary noises.

My invention is illustrated in connection with the accompanying drawings, in which:

Fig. 1 is a plan taken in the direction of the arrow 1 of Fig. 2 of a set up of the material holder on a stand, the sound source and the amplitude indicator also being connected to the stand;

Fig. 2 may be considered as a developed elevation taken on the right angled line 2—2 of Fig. 1 in the direction of the arrows;

Fig. 3 is a diagrammatic plan showing another set up of the combined instrument as a testing device in a sound proof cabinet;

Fig. 4 is a diagrammatic plan of the amplitude indicating instrument set up for receiving all sounds;

Fig. 5 is a horizontal section through the casing of the amplitude indicator taken substantially on the line 5—5 of Fig. 6 with the interior parts shown in plan;

Fig. 6 is a vertical section on the line 6—6 of Fig. 5 in the direction of the arrows omitting the distant interior elements;

Fig. 7 is an interior vertical section on the line 7—7 of Fig. 6 in the direction of the arrows;

Fig. 8 is a vertical section on the line 8—8 of Fig. 5 in the direction of the arrows;

Fig. 9 is an enlarged section on the line 9—9 of Fig. 6 in the direction of the arrows to illustrate principally the check valve;

Fig. 10 is a section on the line 10—10 of Fig. 9 with the inlet cover of the check valve removed;

Fig. 11 is a diagrammatic view of a suitable membrane for the check valve.

Referring first to the constructions of Figs. 1 and 2, giving a general set up of my instruments, a stand is indicated by the numeral 11 having suitable legs 12. Centrally positioned on this stand there is a table 13 having a material holder 14. This holder is in the form of a ring which may be rotated on its vertical axis. Such ring holds the material under test, which is in the form of a disk, by frictional engagement with the periphery of the disk. This table and holder are mounted to rotate on the axial center of the stand. A disk 15 surrounds the table and is rotatable on the stand. The joining edges of the table and the disk have graduations 16 giving the degrees of a circle. The outside of the disk also has similar graduations 17. A screw 18 may be utilized to clamp the table and the material holder on the stand. The table is also provided with a sound baffle 19. This may be extended on opposite sides of the material under test and held in the holder, there being a sufficient space at the center of the material for the reflection of sound from such material. A first radial arm 20 extends from the stand and may swing in a horizontal plane. This may be clamped to the stand and has a finger 21 to register with the protractor scale 17. On this table there is mounted the sound source 22, this being indicated as a siren 23 operated by an electric motor 24. The motor is energized by an electric circuit 25 having a manual control switch 26 and a periodic circuit breaker 27. This circuit breaker is illustrated as a synchronous motor having a commutator in which one section is provided with a conducting segment 28 engaging brushes 29. When the segment is in contact with the brushes the circuit is closed and when out of contact the circuit is open and stops the motor 24. Extended outwardly from the siren there is a resonator 30 comprising a tube with telescopic sections having graduations 31 and having an adjustable means 32 consisting of a pinion 33 meshing with a rack 34. This allows tuning of the resonator.

A second arm 35 extends from the stand and may swing in a horizontal plane and be clamped in any suitable position. This also has a pointer 36 passing over the degrees 17 of a circle. An upright stud 37 supports the sound amplitude indicator designated generally at 38. This is likewise shown as being provided with a resonator 39 which is adjustable. A suitable curved scale 40 with a combined sighting telescope 41 and light source is indicated, and I provide the light to be reflected by a mirror in the amplitude indicating instrument with a telescope or eye piece to view the reflected light. The combined sighting telescope consists of a pair of closely positioned parallel tubes or a single tube with a partition, thus forming two closely adjacent tubes, in one of which there is a light source and the other has telescope lenses. Therefore, the projected light from the light source and the light reflected back to the telescope follow practically the same paths.

Referring especially to the amplitude indicator: This comprises a housing designated generally at 42 (note Figs. 5 through 11). The housing has a socket 43 at the bottom. It is preferably made with substantially cylindrical walls 44, a backing plate 45, and a removable cover plate 46. The walls 44 and the back plate 45 have an opening 47 from which there is a closed built out structure 48 having a window 49, preferably with curved glass. This is to allow viewing of the mirror and reflection of light from the mirror of the instrument. The cover plate is secured to the walls of the casing by bolts 50.

Inside of the casing there is mounted a U-shaped casting 51. This is indicated as having a pair of lugs 52 surfaced on their face and secured to the plate 46 by bolts 53. This casting has a cross bar 54 and side arms 55. An upper bar 56 extends across between the side arms parallel to the bar 54 and outside of the side arms 55, and at the ends of the bar there are a pair of leaf springs 57. To these springs there is secured a wire 58 by studs 59. The spring may be pressed outwardly by screws 60 threaded through lugs 61 on the bar 56. This is to give a tension to the wire carrying the mirror 62.

The bar 54 of the casting 51 has a small bore 63 and a larger bore 64. In this larger bore there is fitted a tube 65 having a head 68 to which is secured a disk 69 with a flange 70. To this flange there is secured a thin diaphragm 71, preferably made of metal, and attached by a ring 72 having screws 73 therethrough. A pressure link 74 is attached to the center of the diaphragm and passes through an opening in the bar 56 and engages the mirror to tilt the same. The disk 69 and the diaphragm 71, therefore, form an air chamber 75.

In order to adjust the relative tension between the mirror and the diaphragm, the tube 65 is threaded as indicated at 76 and is secured in a segmental threaded adjusting disk 77, this having a cutout notch 78. This disk is held in place by brackets 79. A rod 80 having a finger grip end 81 is attached by its inner end 82 to the disk 77. The wall 44 of the casing has an arcuate slot 83, through which the arm 80 extends and allows a swinging movement, the partial turn being sufficient to thread the tube 65 in or out relative to the supporting disk 77, and thus change the tension on the link 74. A lubricating duct 85 leads through the casting 51 so that no air can enter around the tube 65 and the bore in which it is fitted. A sound conveying tube 86 extends through an opening in the plate 46 and is securely fitted to the bar 54 portion of the casting 51.

The delicate check valve 87 illustrated particularly in Fig. 9 comprises a disk 88 having a screw threaded flange 89, this structure forming an internal socket 90. In this there is fitted an internal disk 91 having a shoulder 92 and across this shoulder there is fitted a closure plate 93. This plate fits tightly against the inside surface 94 of the rim of the disk 91. There is a relatively large opening 95 through the disk 88 and small openings 96 and 97 through the plates 93 and the disk 91. The inside of the disk 91 has a slightly coned surface 98 with radial grooves 99. The opening 96 is closed by a movable valve closure 100. This must be exceedingly delicate and I have found for this purpose a bee's wing is satisfactory, such being indicated in general in Fig. 11. The characteristic of the bee's wing is that it has a very thin membrane 101 and on one surface of this membrane there are a series of fine hairs 102. This membrane is attached to the plate 93 by a sealing medium, such as wax, 103, with the hair surface of the wing toward the plate 93. This whole assembly is threaded in the threaded seat 104 formed in the casting 51. On the tube 86 may be formed the resonator tube.

The action of the valve and the sound amplitude indicator with the air chamber is as follows:

The sound is received through the resonator tube and, as above mentioned, this may be tuned to the desired frequency of sound, thus eliminating sounds which it is not desired to use. The condensation or compression parts of the sound wave force the thin valve closure inwardly and allow the compressed air to enter through the ports 96 and 97, building up an air pressure in the air chamber 75. On the rarefaction or decompression part of the sound wave the delicate valve closure seats against the plate 93 and prevents decompression in the air chamber 75, that is, it prevents the outward movement of the air. The action is cumulative, each individual sound wave causing a building up of the air pressure in the air chamber 75 by the compression or condensation part of the wave, the rarefaction part of the wave having no function whatever as regards the air pressure. The action continues until there is a pressure of air in the chamber 75 which becomes normal while the sound is being continued and shows no increase or decrease, the showing being through the movement of the link 74 and the mirror 62, which mirror may reflect light on a scale as above described.

When the sound is discontinued and no sound waves are striking the thin membrane 100, the hairs 102 on this membrane slightly space this from the closure disk 93 and allow air to gradually flow out of the air chamber 75 around the membrane until the air pressure inside and the atmospheric air pressure outside are equalized. This causes a return to zero of the reading by the reflected light. The object of having the sounds produced for a definite period of time and then having the silence is to obtain a number of readings in which the pressure is built up to a maximum and retained at this maximum for a sufficient length of time to know that no greater pressure may be obtained from that particular sound tested, whereby the average readings may be utilized to obtain what may be considered as the correct reading for the particular sound under test. It will be seen, therefore, that the membrane with the valve functions to register only the energy of one half of the sound wave but this is sufficient to obtain a reading of the sound energy and, therefore, by a proper scale reading the amplitude, that is, the intensity or loudness of the sounds.

In Fig. 3 I illustrate another set up for measuring sounds. In this case a stand 105 has a center portion 106 with a material holder 107 thereon. A ring 108 on the stand is marked with graduations to indicate the degrees of a circle. This stand has an arm on which there is a resonator 109 for receiving sounds and another arm on which is supported the sound amplitude indicator 110 having a tunable resonator 111. A sound baffle 112 may be used if desired. This device is mounted in a sound proof cabinet 113 large enough to accommodate an operator, in which there is a scale 114 and a telescopic observing device 115 which may have a source of light to project on the mirror and be reflected back to the telescope. The cabinet is illustrated as having a circular end 116 with a slot 117 through which projects the resonator 109. This slot may be covered by a sound absorbing curtain 118 exposing only the open end of the resonator. By this construction the arm having the resonator may be rotated around the stand to reflect the sound at any desired angle on the material to be tested and such sound is picked up by the resonator of the receiving instrument which gives the indication of the compression. Also, the two resonators may be placed opposite each other for determining the sound absorption properties of material by obtaining a reading of the sound which is transmitted through the material; using the instrument in a sound proof cabinet and having a transmitting resonator only the desired sounds react on the material and on the receiving instrument.

In some cases it is desirable to pick up all of the sounds. In Fig. 4 I show a modification in which the amplitude indicator designated 119 is provided with a receiving bell 120 which may be of any suitable design and is adapted to pick up all of the sounds of whatever frequency. This device, therefore, may be utilized to determine and indicate the amplitude of ordinary noises.

The scale on which the readings from the amplitude indicating instrument are obtained may be graduated in any desired graduations and if the English system is used the graduations may indicate pounds of pressure per square inch in the sound expansion chamber or may be graduated to indicate foot pounds of work done in moving the diaphragm. Manifestly, for dealing with minute quantities, these will be in decimals. I find it advisable, however, to use the metric system, such as the centimeter-gram-second system, in which the scale may be graduated to indicate the force developed as dynes per square centimeter or the work done in ergs; or the scale may be arbitrarily graduated and used to give a relative indication of the amplitude of sound.

From the above description and drawings it will be seen that I have developed an instrument which is responsive to sound waves to indicate the positive pressure built up by the condensation or compression portions of the sound wave, eliminating the influence of the rarefaction or decompression portions of the sound wave. And further, the indicating instrument may be allowed to receive the sounds for a predetermined length of time and then allowed to recover the normal pressure. A succession of such tests may be used to give an average of the maximum sound amplitude.

In addition to the specific sound amplitude indicator, I have developed a comprehensive apparatus and procedure for developing and projecting sounds, and for obtaining accurate readings of the angles from which sounds are reflected from material under test to the receiving instrument, and also for determining the absorption qualities of the materials by rearranging the relation of the sound producing and the receiving instruments.

An important characteristic of my invention is that the sound waves from the sound emitter may be directed onto the face of the sample of material to be tested at any desired angle of incidence and the sounds reflected therefrom, which cause the resonator to respond, may be used to determine both the characteristics of the reflection of the sound from the surface and by comparison with the projected sound, the absorption. The absorption characteristics of the material may also be determined by projecting the sound on one face of the material under test and placing the receiving resonator on the opposite side, this resonator then responding to the sounds which pass through the material.

Another important characteristic resides in the check valve formed of the extremely thin membrane 100, this membrane being fitted across the openings and in contact with a flat surface. While the membrane is illustrated as being secured at one side of the opening, it is obvious that it may be secured at opposite sides, if desired.

This membrane has the function of operating so quickly that even for notes of high pitch it passes a small amount of air on the compression or condensation portions of the sound wave but closes on the decompression or rarefaction portions, thus accumulatively trapping minute quantities of air which, therefore, accumulatively build up an increased air pressure in the expansible air chamber. A reading may then be obtained of the increased pressure in this sound chamber by the movement of the diaphragm, forming a closure on one side of such chamber. It is manifest that various instruments may be used to determine the degree of expansion of the expansion air chamber and thus indicate the accumulatively built up air pressure in such chamber through the action of the compression or condensation portions of continuous sound waves.

An important feature of my invention resides in the sound wave rectifying valve having the thin membrane, such membrane being secured on the inside of the closed chamber, with the intake port through one side of this chamber. This valve functions with a longitudinally vibrating fluid medium to transmit the compression or condensation phases of the vibration, whether these be rhythmic or non-rhythmic, such as noises, and either build up an increased pressure in the chamber or increase the volume of the chamber when the chamber is expansible. The vibrating membrane cannot vibrate outwardly on account of bearing against one surface of the chamber and, hence, does not respond to the decompression or rarefaction phases of the vibrations. Therefore, during these phases the inlet port to the chamber is maintained closed.

My invention in the sound wave rectifying valve is subject to many changes and to different types of uses. Some of these may be exemplified in my copending patent applications: Acoustic testing apparatus and method of operation, filed March 9, 1932, Serial No. 597,828; Portable closed chamber determination of sound absorption, filed July 20, 1932, Serial No. 623,570; Gravimetric determination of sound amplitudes, filed July 20, 1932, Serial No. 623,571.

Various changes may be made in the details of construction without departing from the spirit or scope of the invention as defined by the appended claims.

I claim:
1. In a device as described, a stand having a holder for material to be tested, a first arm connected to the stand and having a sound producer thereon with means to direct sound toward the holder, a second arm connected to the stand and having a sound amplitude indicating device mounted thereon, said device having a sound receiver, said arms being adapted to rotate in a horizontal plane, and means to indicate the relative angle of the sound directing means and the sound receiving means relative to the holder.

2. In a device as described, a holder for material to be tested, a sound producing means having a sound directing means connected thereto, a sound amplitude indicating device having sound receiving means connected thereto, means to position the sound directing and the sound receiving means at desired angles relative to the holder, a control for the sound producing means to produce and to cease producing sounds at desired time intervals, the sound amplitude indicator having a device to cumulatively allow building up of an air pressure during the condensation or compression portions of the sound wave and preventing lessening of this air pressure during the rarefaction or decompression portions of the sound wave, said device having means to allow equalizing of the air pressure during the time the sound producer is silent.

3. A sound amplitude indicating device comprising a structure having an expandible imperforate air chamber with a fixed wall on one side and a movable diaphragm on the other side, a sound receiving means, and said structure having a passage from the chamber to the sound receiving means, a check valve in said passage having a flat interior surface and a slightly coned interior surface spaced apart with openings through said surfaces to said passage, a delicate membrane secured adjacent the flat surface, such flat surface being toward the sound to be received, said membrane admitting inflow of air during the compression or condensation portions of the sound wave, and preventing outflow of air during the rarefaction or decompression portions of the sound wave, and thereby causing a building up of air pressure in the expandible chamber above that of the outside air, and means to allow escape of the trapped air between the membrane and the surface adjacent thereto.

4. A rectifying valve with a closed chamber structure and having an inside surface with an inlet opening, a thin membrane secured and positioned to contact said surface and close said opening, said membrane having the characteristics of moving inwardly during the compression or condensation phases of a rhythmic or non-rhythmic vibration in a fluid medium, and successively admitting portions of the fluid medium to the chamber, and forming a closure for said opening during the decompression or rarefaction phases of the vibration and a releasing means on the said membrane engaging the said inside surface to equalize the pressure on its opposite sides when not subject to vibrations.

5. In a device as described, a holder for material to be tested, a sound baffle positioned in front of said holder and having an opening, a sound projecting instrument positioned to project sound on the material through the opening by an incident sound on one side of the baffle, the reflected sound being on the other side of the baffle, means to receive the reflected sound, and means to indicate the amplitude of such received sound.

6. A sound amplitude indicating device having an expandible air chamber with a flat surface on the inlet side and with an inlet passage leading through such flat surface, a check valve in said chamber formed of a thin membrane bearing against said flat surface and forming a closure for said passage, said membrane being movable slightly from said flat surface during the condensation or compression portions of the sound wave for entrance of air but being pressed close to the flat surface during the rarefaction or decompression portions of the sound wave to retain the trapped air and thereby building up an air pressure in said air chamber above the exterior air pressure, and means operable by the expandible chamber to indicate the degree of expansion of such chamber, said membrane having a releasing means engaging said flat surface to equalize the pressure on its opposite sides when not subjected to sound.

7. A sound rectifying valve having a structure with a flat surface and a sound inlet port through said structure and flat surface, a thin membrane formed of an insect wing secured to said structure and adapted to form a closure for said port, a chamber inside the port, said membrane flexing away from the flat surface during the condensation phases of sound waves and forming a seal against said flat surface and closure of said port during the rarefaction phases of sound waves, the area of said membrane contacting said flat surface being large compared with the area of said port, said membrane having hairs thereon engaging said flat surface and breaking the seal when unacted upon by sound waves.

8. A device as described comprising a frame having a tiltable mirror mounted thereon, a hollow structure having a chamber with a movable diaphragm on one side and a threaded tube on the other side, a rigid connection between the diaphragm and the mirror, and a threaded adjusting disc rotatable on the frame and threaded on the tube with means to rotate said disc.

WILLIAM F. ALDER.